Sept. 20, 1927. 1,642,872
D. W. CHISHOLM
MANUFACTURE OF BUTT AND LAP WELDED TUBES
Filed April 29, 1926 8 Sheets-Sheet 5

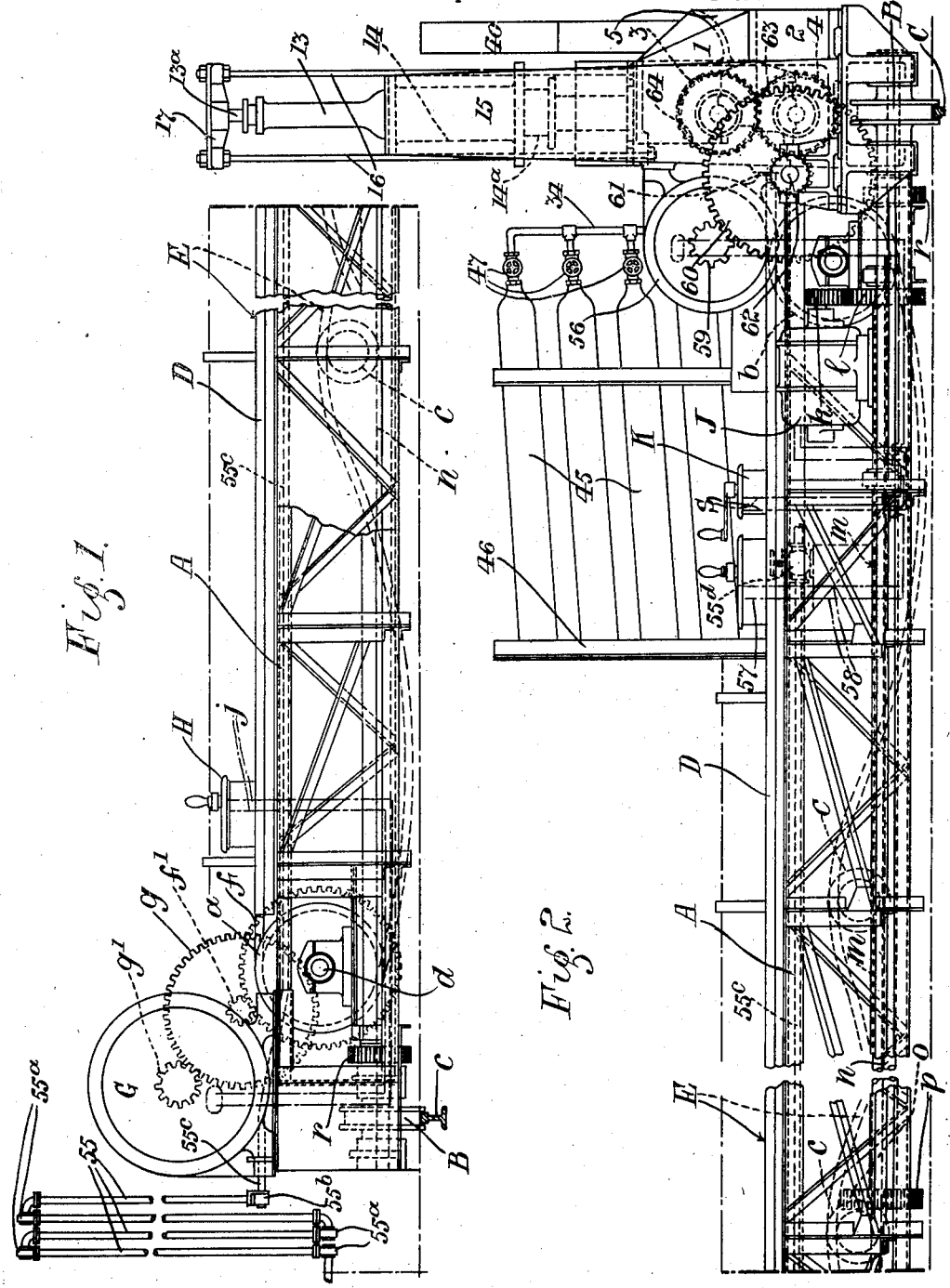

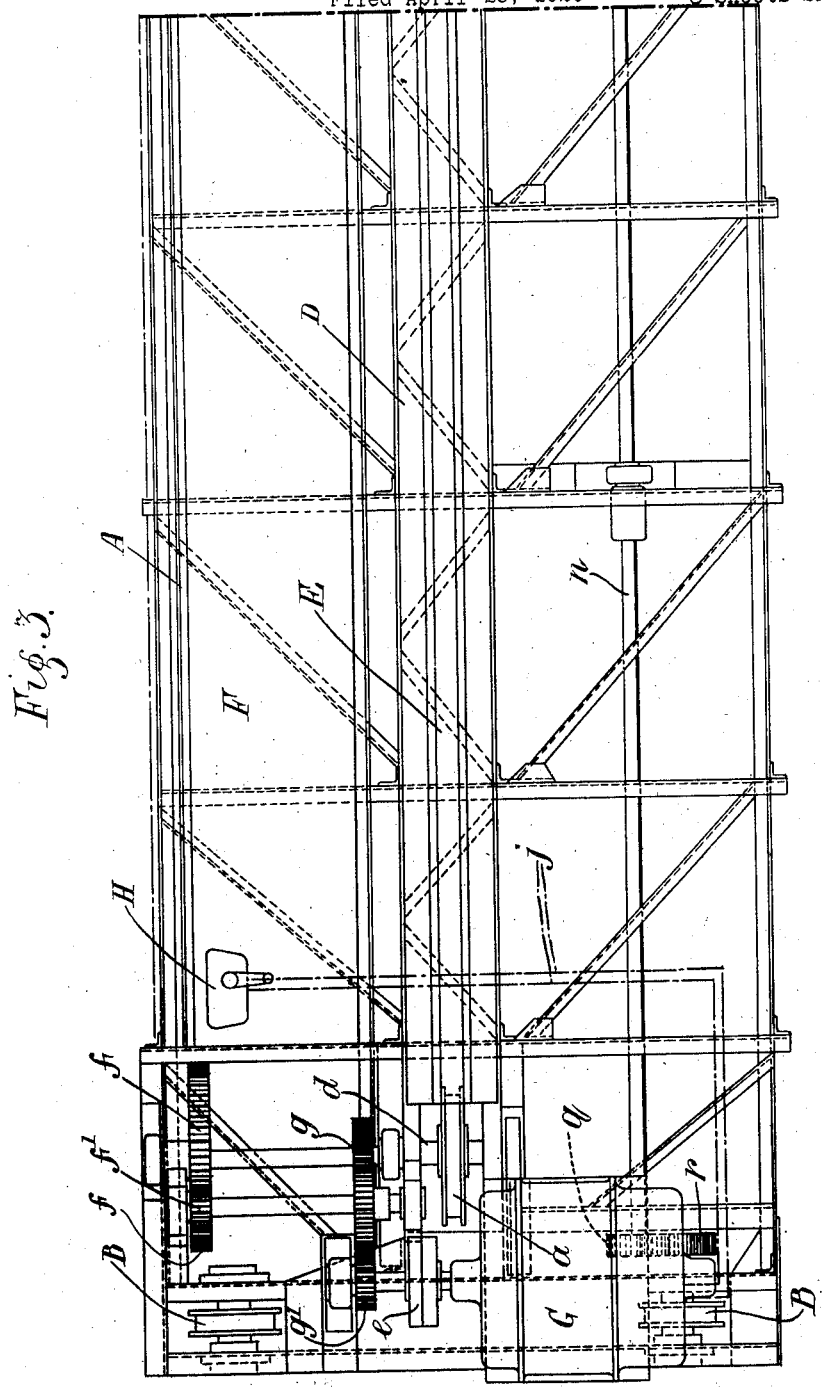

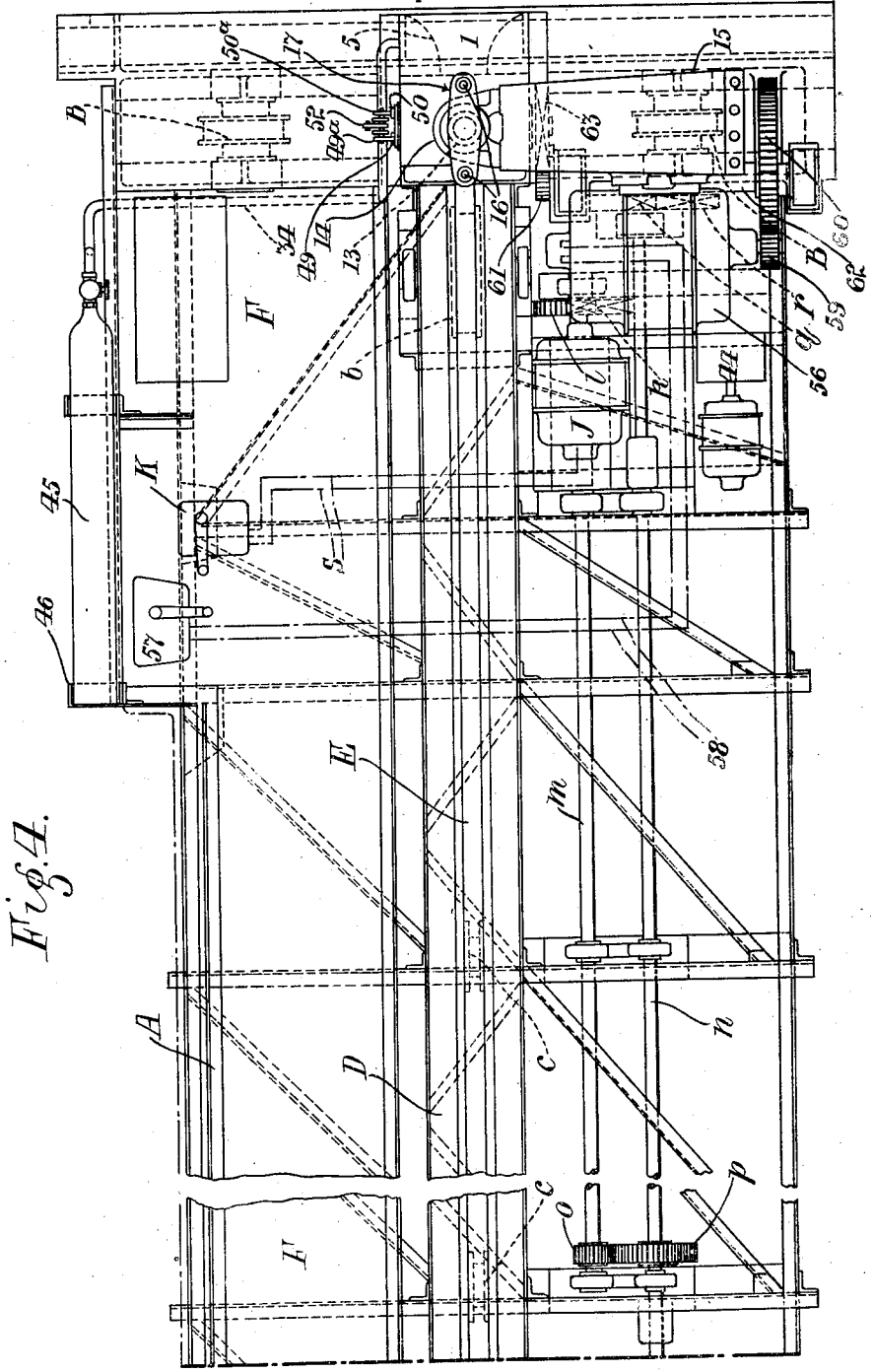

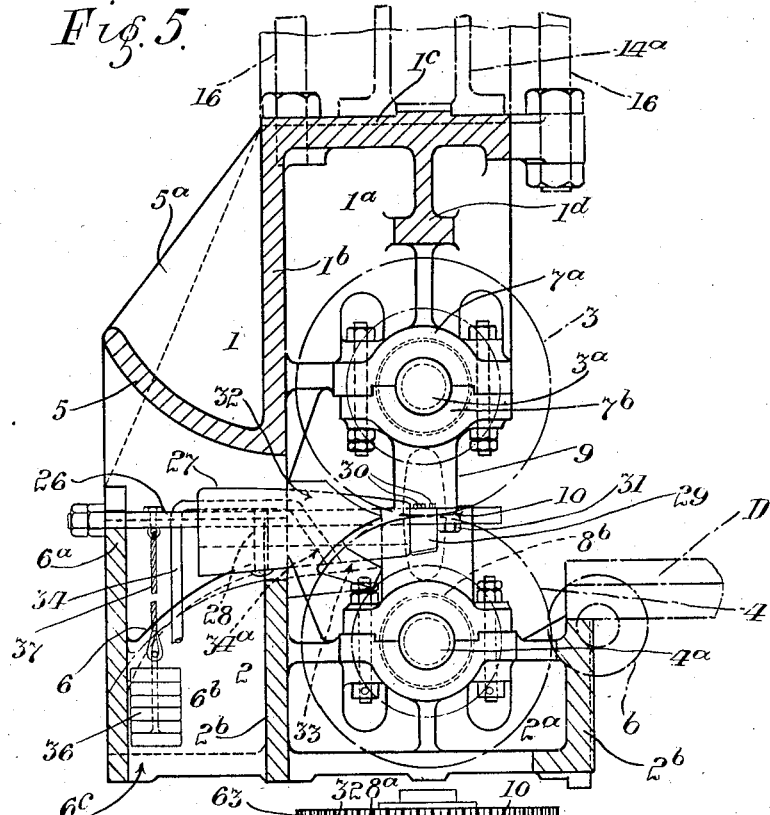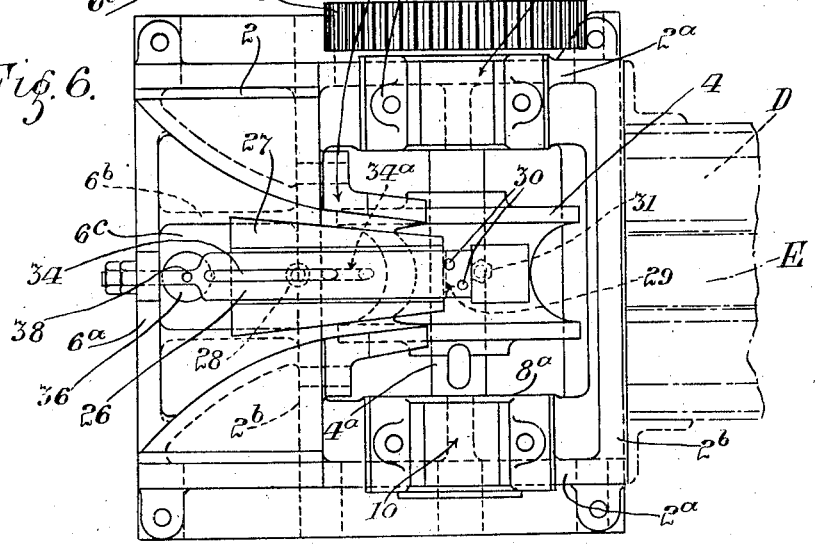

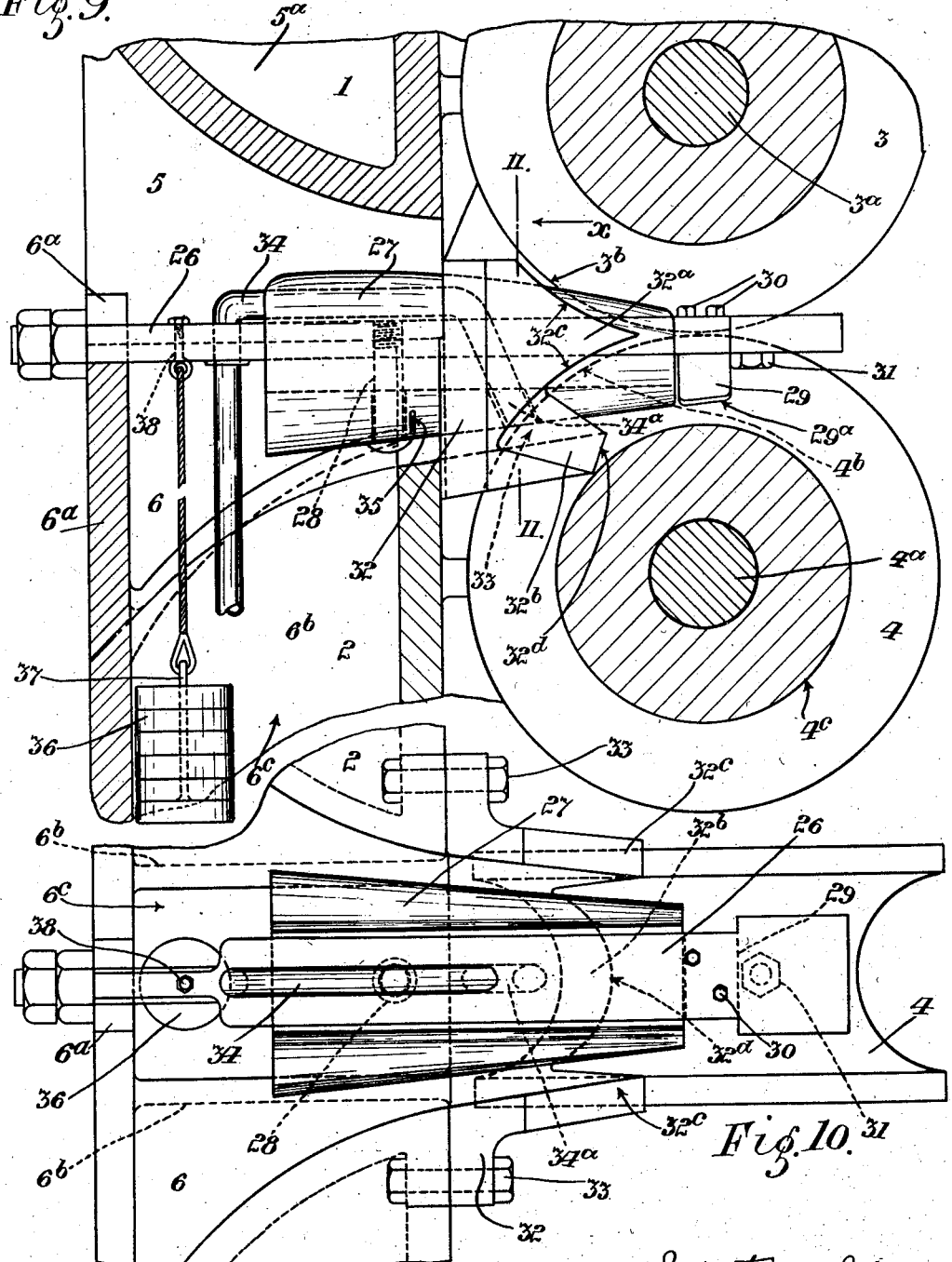

Sept. 20, 1927.
D. W. CHISHOLM
1,642,872
MANUFACTURE OF BUTT AND LAP WELDED TUBES
Filed April 29, 1926          8 Sheets-Sheet 7
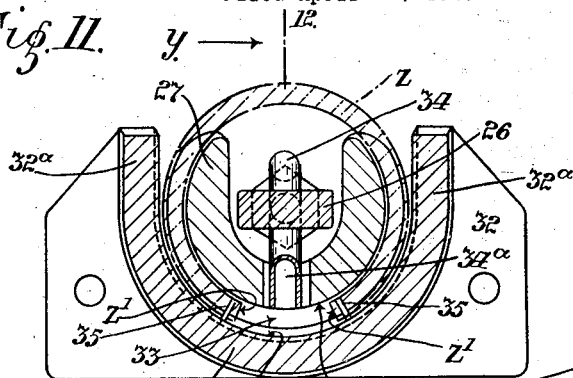
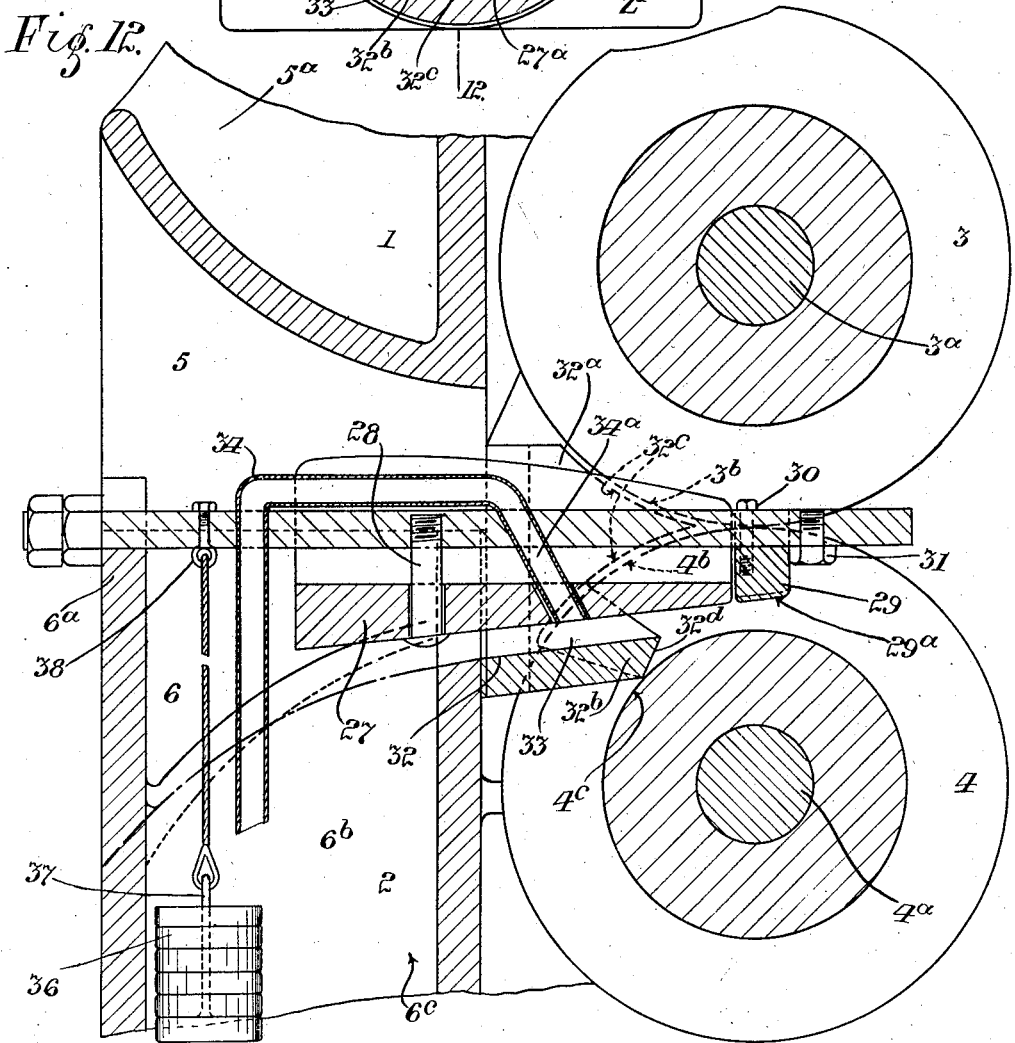
Inventor
Douglas Whimster Chisholm
By
Attorney

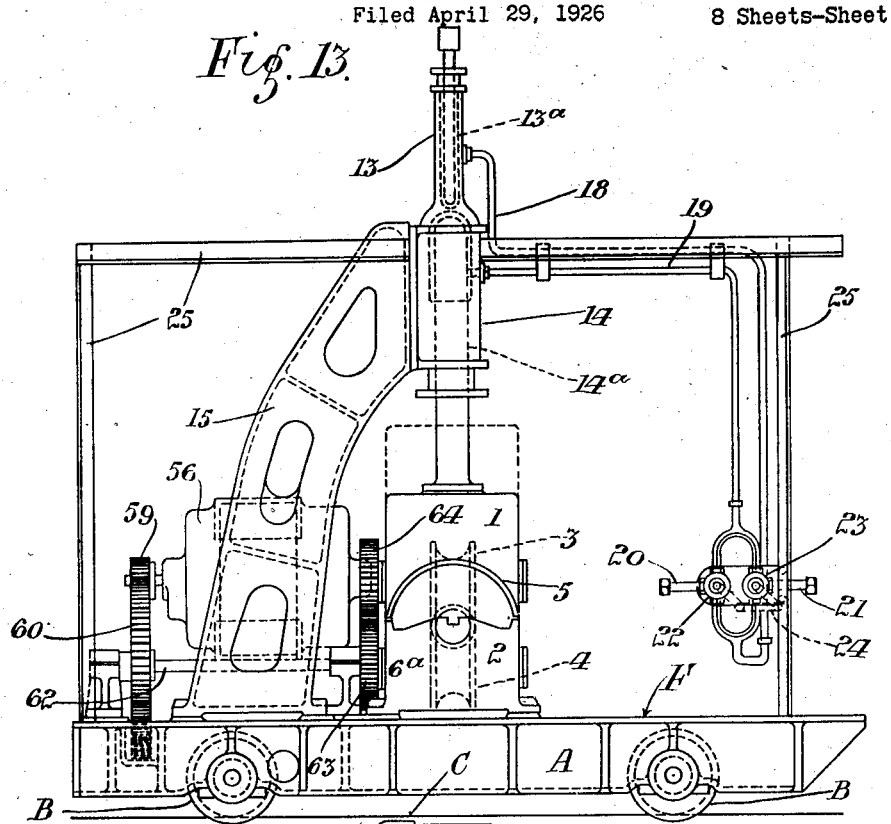
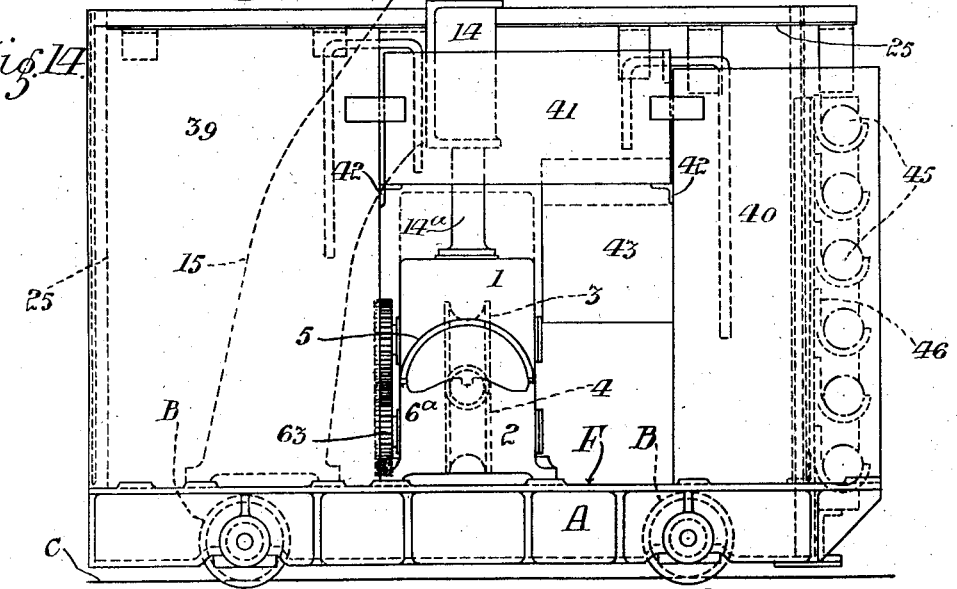

Patented Sept. 20, 1927.

1,642,872

UNITED STATES PATENT OFFICE.

DOUGLAS WHIMSTER CHISHOLM, OF GLASGOW, SCOTLAND, ASSIGNOR TO THE BIRCH-FIELD ENGINEERING COMPANY LIMITED, OF CARDIFF, WALES.

MANUFACTURE OF BUTT AND LAP WELDED TUBES.

Application filed April 29, 1926, Serial No. 105,406, and in Great Britain February 2, 1926.

This invention relates to the manufacture of welded tubes by tube welding machinery of the type wherein a metal strip heated in a furnace is drawn through a bell or die, and, after a suitable welding gas has been applied to the edges of the strip, the edges are closed and welded together by the action of rolls and (or) other suitable devices.

Heretofore in connection with tube welding machinery of the aforesaid type, a number of difficulties presented themselves when it was sought to manufacture the tubes on a commercial scale. Heretofore it has been found necessary to use a mandrel for the purpose of supporting the edges of the strip being acted on by the welding gas, otherwise there is danger of the tubes collapsing, and it also has been found necessary to project the mandrel through the bell or die, with the result that, where so projected there is not sufficient room for the gripping tongs to be passed through and be opened out so as to properly grip the strip. Other difficulties present themselves, such as the necessity for a continuous supply of gas, means for properly controlling the gas, means for enabling the gas to effectively act on the meeting edges of the strips before they pass to the closing rolls and means for effectively controlling the working parts of the machinery so that they shall all operate at the proper times.

The object of the present invention is to overcome all these difficulties and enable gas welded tubes to be produced efficiently on a commercial scale.

According to the present invention, I provide tube welding machinery, of the type specified, having superposed closing rolls combined with a divided welding bell or die composed of separate upper and lower members, the upper closing roll and the upper of the said members being adapted to be raised or lowered simultaneously out of or into operative relationship with the lower closing roll and the lower of the said members respectively; and the process of welding by the said tube welding machinery comprises the steps of raising the upper closing roll and the said upper member of the welding bell or die simultaneously so as to give free access to the strip in the furnace which is situated behind the welding machine, inserting tongs into the furnace, gripping the heated metal strip by the said tongs, lowering simultaneously the upper closing roll and the upper member of the bell or die into operative relationship with the lower closing roll and the lower member of the said bell or die, attaching the tongs to the usual draw bench chain, drawing the heated strip by means of the said chain through the welding die, applying a continuous stream of welding gas, such as oxygen, to the abutting edges of the skelped strip and, finally, closing and welding the said edges together by means of the closing rolls.

Preferably, the upper closing roll and the upper member of the welding bell or die are connected and adapted to be raised and lowered together by fluid pressure means, and, in conjunction with the tube welding machinery herein proposed, I provide means for supporting the interior and exterior of the edges of the strip just before it is acted on by the closing rolls, the edges of the strip while so supported being subjected to a bath of welding gas. I may also use means adapted to press on the interior of the edges of the skelped strip as it is passing through the closing rolls, the pressure of the last mentioned means being capable of regulation.

One embodiment of my invention, as applied to a travelling tube welding machine to be used in conjunction with a strip heating furnace, will now be described by way of example and with reference to the accompanying drawings, in which:—

Figs. 1 and 2 in conjunction form a side view of the tube welding machine and its accessory parts, Fig. 2 being a continuation of Fig. 1;

Figs. 3 and 4 in conjunction form a plan view corresponding to Figs. 1 and 2;

Fig. 5 is a view of part of the tube welding machine showing in part sectional elevation the arrangement of the divided welding bell and superposed closing rolls;

Fig. 6 is a plan view corresponding to Fig. 5, without the upper closing roll and the upper member of the welding bell;

Fig. 9 is a side elevation of the mandrel, guide, and accessory parts, in detail;

Fig. 10 is a plan view corresponding to Fig. 9;

Fig. 11 is a section in the plane of the line 11—11 in Fig. 9 looking in the direction of the arrow $w$;

Fig. 12 is a section in plane of the line 12—12 in Fig. 11 looking in the direction of the arrow $v$;

Fig. 13 is a view of the tube welding machine from the front, with parts removed for the sake of clearness;

Fig. 14 is a view illustrating an arrangement of water-screening tanks for protecting the side of the machine adjacent to the furnace.

Referring to Figs. 1 to 4 of the drawings;

The tube welding machine comprises a frame A mounted on wheels B running on rails C laid in front of the furnace. On the frame A is a draw bench D with an endless draw chain E, parallel with which is a platform F (Figs. 3 and 4). The chain E is carried by sprocket wheels $a$ and $b$ and is supported between the said wheels by guide pulleys $c$. The shaft $d$ of the chain wheel $a$ is connected to the electric motor G by a flexible coupling $e$ (Fig. 3) and reduction gearing $f$, $f^1$, $g$, $g^1$; and the motor G is controlled by an electric controller H of known design mounted on the platform F and in connection with the motor G by wiring $j$.

For the travelling movement of the machine, an electric motor J is provided, connected by gear wheels $k$ and $l$ to a shaft $m$, which in turn drives a main shaft $n$ by means of gear wheels $o$ and $p$. At each end of the shaft $n$, a gear wheel $q$ (Figs. 3 and 4) is fitted, meshing with a gear wheel $r$ on the shaft of the bearing wheels B. The electric motor J is controlled from the platform F aforesaid by means of an electric controller K and wiring $s$.

Figure 7:
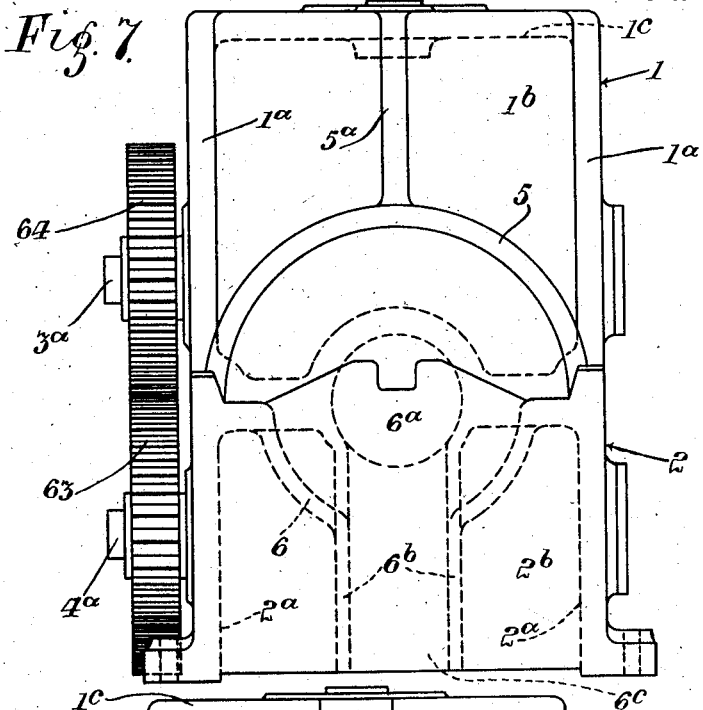
Fig. 7 is a front view of the arrangement shown in Fig. 5, but without the mandrel and parts accessory thereto.
Figure 8:
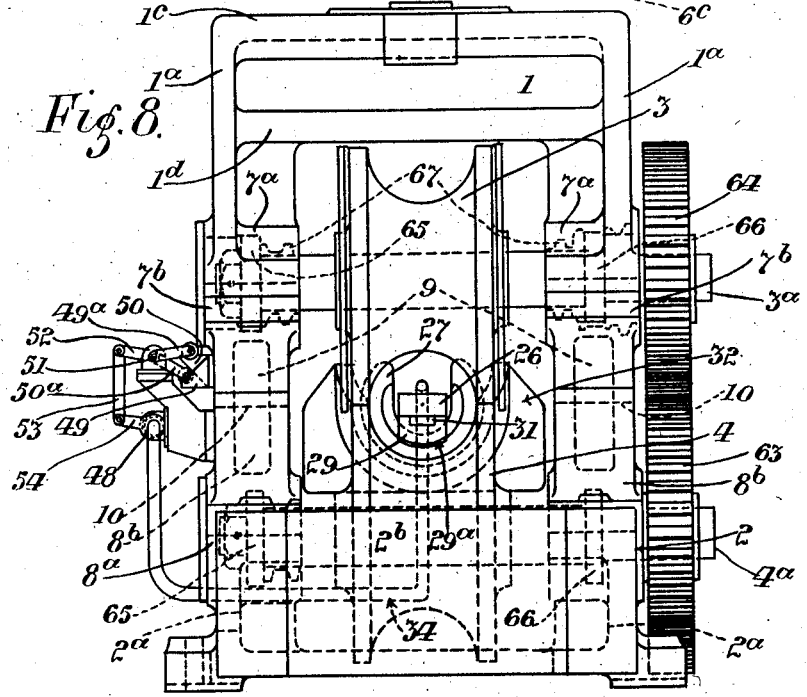
Fig. 8 is a view of the same arrangement from the rear.

Referring to Figs. 5 to 8 of the drawings:—

On the tube welding machine is a vertically movable upper housing 1 and a fixed lower housing 2, the upper housing 1 carrying the upper closing roll 3 and the upper-half 5 of the welding bell of the machine, and the lower housing 2 carrying the lower closing roll 4 and the lower half 6 of the bell. The upper housing 1 comprises two parallel side members $1^a$, an integral wall $1^b$, and an integral bridge $1^c$, the latter being formed with a strengthening rib $1^d$. On the side members $1^a$ provision is made for the upper parts $7^a$ of the bearings for the upper closing roll 3. In the drawings, the upper half 5 of the welding bell is shown formed integral with the housing 1 and reinforced by an integral web $5^a$, but the said half 5 of the bell may be removably secured by bolts or otherwise to the housing 1, as may also the lower half 6 of the bell with respect to the lower housing 2, so that the halves of the bell can be changed at any time quickly and easily. The lower housing 2 is of rectangular shape and comprises two parallel side members $2^a$ and integral connecting walls $2^b$. On the side members $2^a$, provision is made for the lower parts $8^a$ of the bearings for the lower closing roll.

The lower half 6 of the welding bell, as shown in the drawings, is cast integral with the lower housing 2, the combined structure including an upstanding wall $6^a$ and a pair of symmetrically disposed webs $6^b$ between which a passage $6^c$ is formed for a purpose hereinafter specified.

The closing rolls 3, 4 and the upper and lower halves 5, 6 of the welding bell meet in operative relationship when the upper and lower housings 1, 2 are together. In this position two depending lugs 9 on the lower parts $7^b$ of the upper closing roll bearings engage with two corresponding recesses 10 provided in the upper parts $8^b$ of the bearings for the lower roll, so as to prevent lateral relative movement of the upper and lower housings, 1, 2, when together.

Referring particularly to Fig. 13:—

For raising and lowering the upper housing 1, two hydraulic rams comprising cylinders 13, 14 are provided. These cylinders are situated directly above the closing rolls 3, 4 and are carried from the base of the machine by an overhanging frame or column 15. The ram for lifting the said upper housing 1 is disposed above the ram for effecting the downward movement thereof, the plunger $14^a$ of the latter ram being connected directly at its lower end to the said upper housing 1, and the lifting ram plunger $13^a$ being connected thereto through the medium of two connecting rods 16 attached at their lower ends to the said upper housing 1 and at their upper ends to a cross head 17 carried by the top end of the said lifting ram plunger $13^a$.

The upper cylinder 13 is provided with a combined admission and exhaust pipe 18, and the lower cylinder 14 is fitted with a similar pipe 19. Both of the pipes 18, 19 communicate with the supply and return conduits of an outside pressure fluid system, communication being made with the said supply and return conduits by means of connections 20 and 21 respectively. A two-way cock 22 is arranged between the supply connection 20 and the pipes 18, 19 and a similar two-way cock 23 is disposed between the pipes 18, 19 and the return connection 21. These cocks 22, 23 are coupled together by a link 24 and are so arranged that when the pipe 18 and its cylinder 13 are in communication with the supply connection 20, the pipe 19 and its cylinder 14 are in communication with the return connection 21, and vice versa. By this arrangement the upper closing roll 3 and upper half 5 of the welding bell can be raised and lowered simultaneously. The pipes 18, 19 are supported by a light frame work 25 and the cocks 22, 23 are so disposed as to be within convenient reach of the operator on the control platform F.

Referring particularly to Figs. 9 to 12 of the drawings:—

On the lower half 6 of the welding bell, a long flat bar 26 is provided, one end thereof being loosely supported by the upstanding wall 6ª aforesaid. The heated strip from the furnace is drawn through the welding bell 5, 6 in such a manner (with edges downward) as not to be obstructed by the wall 6ª. To the bar 26 a tapering and channelled mandrel 27 is loosely attached, the said mandrel having substantially the form of a U-shaped sleeve. The mandrel 27 is supported from the bar 26, as shown, by means of a bolt 28 secured to the underside of the said bar. Adjacent to the smaller end of the mandrel 27, a second mandrel 29 is fitted to the bar 26, this latter mandrel consisting of a solid metal block curved convexly at the lower surface 29ª thereof and rigidly attached by means of bolts 30 to the bar 26. A stop 31 is arranged on the underside of the bar 26 in advance of the said mandrel 29 so as to prevent the mandrel being shifted or loosened by the frictional action of the interior of the edges of the skelped strip.

A guide member 32 is attached by means of bolts 33 (Fig. 10) to the lower half 6 of the welding bell. The said member comprises a pair of spaced vertical jaws 32ª and a concave bridge 32ᵇ connecting the said jaws 32ª together at the bottom thereof, the jaws 32ª and connecting bridge 32ᵇ being made of converging shape. The edges of the jaws 32ª are made of concave, tapering shape, as shown at 32ᶜ, so as to correspond to the contiguous peripheral surfaces 3ᵇ, 4ᵇ of the upper end lower closing rolls. In addition, the front of the connecting bridge 32ᵇ is chamfered and rounded off, as shown at 32ᵈ, so as to fit closely up to the contiguous semi-circular periphery 4ᶜ of the lower closing roll 4. In this manner the exterior of the edges of the strip are supported right up to the pass between the closing rolls 3, 4.

Between the convex outer surface 27ª (Fig. 11) of the mandrel 27 and the concave inner surface 32ᶜ of the guide member 32, a partial annulus or pocket 33 is formed, which, in practice, is bounded at the sides by the abutting edges $Z_1$ of the skelped strip Z (see Fig. 11). Into this partial annulus or pocket 33, the welding gas is supplied, as hereinafter described, by a pipe 34 which passes along the upper side of the bar 26 to a nozzle 34ª projecting downwardly through the bar 26 and mandrel 27. The gas, as it issues from the nozzle 34ª, is deflected by the concave inner surface 32ᶜ of the guide member 32 on to the abutting edges $Z_1$ of the skelped strip Z. To space the mandrel 27 away from the guide member 32, a pair of small projecting pins 35 (Figs. 9 and 11) may be fitted to the under surface of the mandrel 27 in advance of the nozzle 34ª.

The pressure of the mandrel 29 on the interior of the edges of the strip passing through the closing rolls may be regulated and maintained by means of weights 36 suspended by means of a carrier and rope 37 attached to a bolt 38 carried by the bar 26, the passage 6ᶜ being provided in the lower half 6 of the welding bell to accommodate the said carrier and rope 37.

Along the face of the welding machine adjacent to the furnace, a screen of water tanks is provided (see Fig. 14) these tanks being open at the top thereof and being supported in place by a light frame work 25 of angle girders. At the sides of the machine, two such tanks 39, 40 are provided, each extending upwards from the base of the machine to approximately the level of the hydraulic ram 14, 14ª aforesaid. Between these two tanks 39, 40, a third tank 41 of smaller dimensions is provided, the said tank 41 being supported by brackets 42 on the side tanks 39, 40. Depending from the said smaller tank 41 at the side of the housings 1, 2 remote from the overhanging frame or column 15, a guard plate 43 lined with asbestos is provided for the purpose of screening the operator on the control platform F or the workman or men carrying out the welding operations. Through the said screening tanks 30, 40, 41, cooling water is circulated by means of an electrically driven pump 44 (Fig. 4).

It is very important that the welding gas be applied to the abutting edges of the strip just before entering the closing rolls 3, 4 and in a continuous stream. To this end the welding gas (oxygen) is contained in a series of bottles or cylinders 45 located in a rack 46 in proximity to the closing rolls 3, 4 (see Figs. 2 and 4), each cylinder 45 having a connection to the pipe 34 leading to the nozzle 34ª (Figs. 9 to 12) in the mandrel 27. Stop cocks 47 are arranged in connection with the cylinders 45 and as one cylinder is emptied its stop cock is closed and the stop cock of the next cylinder is opened manually so as to keep up a continuous supply of gas. The flow of oxygen from the respective cylinder 45 to the nozzle 34ª is controlled automatically by means of a stop cock 48 (see Fig. 8) adapted to be actuated according to the raising and lowering of the upper housing 1.

For this purpose a pair of small cam surfaces 49, 50 (Fig. 8) are provided on the depending lug 9 on the lower part 7ᵇ of the upper roll bearing. Rocking levers 49ª, 50ª disposed respectively in the planes of the surfaces 49 and 50 are keyed to a shaft 51, which is rotatably mounted on a bracket 51ª carried by the upper part 8$^b$ of the adjacent bearing of the lower roll 4, to which also is keyed an arm 52. The arm 52 is connected by a link 53 to the handle 54 of the stop cock 48 in the pipe 34 supplying oxygen to the nozzle 34$^a$. On the lowering of the upper housing 1, the cam surface 50 comes down into contact with the lever 50$^a$ and moves the arm 52 upward so as to open the stop cock 48. Similarly on the raising of the housing 1, the surface 49 comes up into contact with the lever 49$^a$ and thereby closes the cock 48. These actions ensure that when the upper housing 1 is raised the gas is cut off and when the said housing is lowered the gas is turned on.

The cooling of the bell or die 5, 6 and support or guide member 32 may be effected by means comprising a hydrant composed of a series of jointed pipes 55 (see Fig. 1). These pipes are connected by scissors joints 55$^a$, the whole being carried by a similar joint 55$^b$ on the pipe 55$^c$ which is connected to a stop valve 55$^d$ (Fig. 2) on the control platform F, which valve, in turn, is in communication with an outside water supply.

An electric motor 56 (Figs. 2 and 4) is provided to drive the closing rolls 3, 4, the said motor 56 having wiring 58 and being controlled by an electric controller 57 on the platform F. By means of suitable gear wheels 59, 60, 61 and shafting 62, the drive of the motor 56 is transmitted to a toothed wheel 63 on the shaft 4$^a$ of the lower roll 4, which wheel 63 in turn gears with a similar wheel 64 on the shaft 3$^a$ of the upper roll 3 when the two rolls 3, 4 are in operative relationship.

Preferably the bearings for the shafts 3$^a$, 4$^a$ (Fig. 8) of the upper and lower closing rolls 3, 4 are of the ball or roller type, the outer ring 65 of the ball or roller bearing at one end only of the respective shaft 3$^a$ or 4$^a$ being fixed, whilst the outer ring 66 of the bearing at the other end of the shaft 3$^a$ or 4$^a$ is loose so as to allow for side play and expansion. Grooves 67 packed with asbestos rings may be provided in the said bearings adjacent to the rolls.

In the manufacture of tubes by the machinery hereinbefore described a considerable increase in the output of welded tubes per unit of time is effected. The process of welding comprises, in the first place, the raising of the upper housing 1 with the upper closing roll 3 and the upper half 5 of the welding bell, the same being effected by operation of the controller 57 on the platform F as aforesaid. Thereafter, gripping tongs are passed through the space between the raised upper housing 1 and the lower housing 2 into the strip heating furnace, and one of the heated strips in the furnace is gripped by the tongs. The upper housing 1 with the upper roll 3 and the upper half 5 of the bell is then lowered into operative relationship with the lower housing 2, and the tongs are attached to the draw bench chain E. By means of the said chain and tongs the heated strip is drawn through the bell 5, 6, the strip passing into the bell at the upper side thereof and being bent downwards so that its edges Z$_1$ pass under the mandrel 27 into the space between the said mandrel and the bottom of the bell 5, 6 and guide member 32. The member 32 forms a removable continuation of the bell and supports the edges of the strip up to the pass of the rolls 3 and 4.

When the upper and lower housings 1, 2 are in operative relationship, welding gas from the cylinders 45 is supplied to the partial annulus or pocket 33 as hereinbefore explained, and acts on the edges Z$_1$ of the strip Z just before the pressure of the rolls 3, 4 takes place. During this time the edges are supported both internally and externally so that they cannot buckle, bend or collapse when being acted on by the gas.

By means of the second mandrel 29 aforesaid, an effective joint is ensured on the interior of the edges of the strip, the pressure of this mandrel being maintained by the interchangeable weights 36. The welded tube is afterwards cooled by means of the hydrant 55 and may be otherwise treated in known manner as desired. The process of welding is continuous, strip after strip being dealt with as the machine is moved along as aforesaid in front of the furnace.

It is obvious that many constructional modifications may be made in the tube welding machine described without departing from the scope of my invention and it will therefore be understood that I do not confine myself to the constructional forms hereinbefore set forth.

Having now fully described my invention, what I claim and desire to secure by Letters Patent is:—

1. Tube welding machinery comprising superposed closing rolls, means for rotating the said rolls, a divided welding die composed of separate upper and lower members, and means whereby the upper closing roll and the upper of the said members can be raised or lowered simultaneously out of or into operative relationship with the lower closing roll and the lower of the said members respectively.

2. Tube welding machinery comprising superposed closing rolls, means for rotating the said rolls, a divided welding die composed of separate upper and lower members, means whereby the upper closing roll and the upper of the said members can be raised or lowered simultaneously out of or into operative relationship with the lower closing roll and the lower of the said members respectively, and means for supporting the interior and exterior of the edges of the skelped strip just before it is acted on by the rolls.

3. Tube welding machinery comprising superposed closing rolls, means for rotating the said rolls, a divided welding die composed of separate upper and lower members, means whereby the upper closing roll and the upper of the said members can be raised or lowered simultaneously out of or into operative relationship with the lower closing roll and the lower of the said members respectively, means for supporting the interior and exterior of the edges of the skelped strip just before it is acted on by the rolls, and means for subjecting the edges of the skelped strip to a bath of welding gas while being so supported.

4. Tube welding machinery comprising superposed closing rolls, means for rotating the said rolls, a divided welding die composed of separate upper and lower members, means whereby the upper closing roll and the upper of the said members can be raised or lowered simultaneously out of or into operative relationship with the lower closing roll and the lower of the said members respectively, a mandrel adapted to bear on the interior of the edges of the skelped strip before said strip enters the closing rolls, a guide adapted to support the exterior of the edges of the strip, and means for supplying a welding gas to the pocket formed between the outer surface of the mandrel, the inner surface of the guide, and the contiguous edges of the strip.

5. Tube welding machinery comprising superposed closing rolls, means for rotating the said rolls, a divided welding die composed of separate upper and lower members, means whereby the upper closing roll and the upper of the said members can be raised or lowered simultaneously out of or into operative relationship with the lower closing roll and the lower of the said members respectively, a mandrel adapted to bear on the interior of the edges of the skelped strip before said strip enters the closing rolls, a pivotal member carrying the said mandrel, a guide adapted to support the exterior of the edges of the strip at the same time as the interior of the edges thereof is being acted on by the mandrel, and means for supplying a welding gas to the pocket formed between the outer surface of the mandrel, the inner surface of the guide, and the contiguous edges of the strip.

6. Tube welding machinery comprising superposed closing rolls, means for rotating the said rolls, a divided welding die composed of separate upper and lower members, means whereby the upper closing roll and the upper of the said members can be raised or lowered simultaneously out of or into operative relationship with the lower closing roll and the lower of the said members respectively, a mandrel adapted to bear on the interior of the edges of the skelped strip before said strip enters the closing rolls, a guide adapted to support the exterior of the edges of the strip at the same time as the interior of the edges thereof is being acted on by the mandrel, means for supplying a welding gas to the pocket formed between the outer surface of the mandrel, the inner surface of the guide, and the contiguous edges of the strip, and means whereby the supply of welding gas is controlled automatically by the raising and lowering of the upper closing roll and the upper member of the said die.

7. Tube welding machinery comprising superposed closing rolls, means for rotating the said rolls, a divided welding die composed of separate upper and lower members, means whereby the upper closing roll and the upper of the said members can be raised or lowered simultaneously out of or into operative relationship with the lower closing roll and the lower of the said members respectively, a mandrel adapted to bear on the interior of the edges of the skelped strip before said strip enters the closing rolls, a pivoted member carrying the said mandrel, a guide adapted to support the exterior of the edges of the strip at the same time as the interior of the edges thereof is being acted on by the mandrel, means for supplying a welding gas to the pocket formed between the outer surface of the mandrel, the inner surface of the guide, and the contiguous edges of the strip, and yielding means adapted to press on the interior of the edges of the skelped strip as said strip is passing through the closing rolls.

8. Tube welding machinery comprising superposed closing rolls, means for rotating the said rolls, a divided welding die composed of separate upper and lower members, means whereby the upper closing roll and the upper of the said members can be raised or lowered simultaneously out of or into operative relationship with the lower closing roll and the lower of the said members respectively, a mandrel adapted to bear on the interior of the edges of the skelped strip before said strip enters the closing rolls, a pivoted member carrying the said mandrel, a guide adapted to support the exterior of the edges of the strip at the same time as the interior of the edges thereof is being acted on by the mandrel, means for supplying a welding gas to the pocket formed between the outer surface of the mandrel, the inner surface of the guide and the contiguous edges of the strip, means whereby the supply of welding gas is controlled automatically by the raising and lowering of the upper closing roll and the upper member of the said die, means adapted to press on the interior of the edges of the skelped strip as said strip is passing through the closing rolls, and means whereby the pressure of the last mentioned means on the said interior edges of the strip is capable of regulation.

9. Tube welding machinery comprising superposed closing rolls, means for rotating the said rolls, a divided die composed of separate upper and lower members, fluid pressure means whereby the upper closing roll and the upper of the said members can be raised or lowered simultaneously out of or into operative relationship with the lower closing roll and the lower of the said members respectively, a mandrel adapted to bear on the interior of the edges of the skelped strip before said strip enters the said rolls, a pivotal member carrying the said mandrel, a guide adapted to embrace the exterior of the edges of the strip at the same time as the interior of the said edges is being acted on by the mandrel, means for supplying a welding gas to the pocket formed between the outer surface of the mandrel, the inner surface of the guide, and the contiguous edges of the strip, means whereby the supply of oxygen is controlled automatically by the raising and lowering of the upper closing roll and the upper member of the said die, a second mandrel adapted to press on the interior of the edges of the skelped strip as said strip is passing through the closing rolls, and means whereby the pressure of the last mentioned mandrel may be regulated and maintained by an adjustable weight.

10. Tube welding machinery comprising a movable upper housing, and a fixed lower housing, an upper closing roll carried by the said upper housing, a lower closing roll carried by the said lower housing, a divided welding die having its upper half integral with said upper housing and its lower half integral with said lower housing, and fluid pressure means whereby the said upper housing can be raised or lowered out of or into operative relationship with the said lower housing.

11. Tube welding machinery comprising a movable upper housing, and a fixed lower housing, an upper closing roll carried by the said upper housing, a lower closing roll carried by the said lower housing, a divided welding die having its upper half integral with said upper housing and its lower half integral with said lower housing, fluid pressure means whereby the said upper housing can be raised or lowered out of or into operative relationship with the said lower housing, and means whereby lateral relative movement of the upper and lower housings when together is prevented.

12. Tube welding machinery comprising a vertically movable upper housing, and a relatively fixed lower housing, an upper closing roll carried by the said upper housing, a lower closing roll carried by the said lower housing, a divided welding die having its upper half integral with said upper housing and its lower half integral with said lower housing, means for rotating the said closing rolls, means whereby lateral relative movement of the upper and lower housings when together is prevented, a lower hydraulic ram located above the closing rolls, means connecting the lower end of the plunger of said ram to the said upper housing, an upper hydraulic ram superposed above said lower ram, means connecting the upper end of the plunger of said upper ram to the said upper housing, means for supporting the said rams, and means for controlling the admission and exhaust of pressure fluid to and from the said rams so as to effect raising and lowering of the said upper housing.

13. Tube welding machinery comprising a vertically movable upper housing, and a relatively fixed lower housing, an upper closing roll carried by the said upper housing, a lower closing roll carried by the said lower housing, a divided welding die having its upper half integral with said upper housing and its lower half integral with said lower housing, means for rotating the said closing rolls, fluid pressure means whereby the said upper housing can be raised or lowered out of or into operative relationship with the said lower housing, a framework built along the side of the welding machine adjacent to the furnace side, screening tanks carried by said framework one at each side of the machine, supporting brackets on the upper part of the said tanks, a central screening tank carried by said brackets, and means for circulating cooling water through the tanks.

14. Tube welding machinery comprising a vertically movable upper housing, and a relatively fixed lower housing, an upper closing roll carried by the said upper housing, a lower closing roll carried by the said lower housing, a divided welding die having its upper half integral with said upper housing and its lower half integral with said lower housing, means for rotating the said closing rolls, means whereby lateral relative movement of the upper and lower housings when together is prevented, a lower hydraulic ram located above the closing rolls, means connecting the lower end of the plunger of said ram to the said upper housing, an upper hydraulic ram superposed above said lower ram, means connecting the upper end of the plunger of said upper ram to the said upper housing, means for supporting the said rams, means for controlling the admission and exhaust of pressure fluid to and from the said rams so as to effect raising and lowering of the said upper housing, a framework built along the side of the welding machine adjacent to the furnace, side screening tanks carried by said framework one at each side of the machine, supporting brackets on the upper part of the said tanks, a central screening tank carried by said brackets, an asbestos lined guard plate depending from said central screening tank, an overflow in one of the side screening tanks, and an electrically driven pump for circulating cooling water through the tanks.

15. Tube welding machinery comprising a vertically movable upper housing, and a relatively fixed lower housing, an upper closing roll carried by the said upper housing, a lower closing roll carried by the said lower housing, a divided welding die having its upper half integral with said upper housing and its lower half integral with said lower housing, means for rotating the said closing rolls, fluid pressure means whereby the said upper housing can be raised or lowered out of or into operative relationship with the said lower housing, a mandrel adapted to bear on the interior of the edges of the skelped strip before said strip enters the closing rolls, a pivoted member carrying the said mandrel, a guide adapted to embrace the exterior of the edges of the strip at the same time as the interior edges thereof are being acted on by the mandrel, a rack located near the closing rolls, a series of cylinders carried by said rack and containing welding gas, a nozzle for supplying welding gas to the pocket formed by the outer surface of the mandrel, the inner surface of the guide, and the contiguous edges of the strip, individual connections between said cylinders and a common pipe line, stop cocks adapted to control the said connections, and means whereby the flow of gas from the pipe line to the said nozzle is controlled automatically by the raising and lowering of the said upper housing.

16. Tube welding machinery comprising a vertically movable upper housing, and a relatively fixed lower housing, an upper closing roll carried by the said upper housing, a lower closing roll carried by the said lower housing, a divided welding die having its upper half integral with said upper housing and its lower half integral with said lower housing, means for rotating the said closing rolls, fluid pressure means whereby the said upper housing can be raised or lowered out of or into operative relationship with the said lower housing, a shaft carrying the lower roll, a toothed wheel on the said shaft, an electric motor, means connecting the said motor to the said toothed wheel, a shaft for the upper roll, a toothed wheel on the said shaft adapted to gear with the toothed wheel on the lower roll when the upper and lower housings are in operative relationship, bearings for the shaft of the upper closing roll, means permitting side play and expansion of the said shaft in said upper bearings, a depending lug formed on the lower portion of each of said upper bearings, bearings for the shaft of the lower closing roll, means permitting side play and expansion of the said shaft in said lower bearings, a recess formed in the upper portion of each of said lower bearings, the said depending lugs engaging in said recesses when the upper and lower housings are in operative relationship.

17. Tube welding machinery comprising a vertically movable upper housing, and a relatively fixed lower housing, an upper closing roll carried by the said upper housing, a lower closing roll carried by the said lower housing, a divided welding die having its upper half integral with said upper housing, means for rotating the said closing rolls, fluid pressure means whereby the said upper housing can be raised or lowered out of or into operative relationship with the said lower housing, means whereby lateral relative movement of the upper and lower housings when together is prevented, means for protecting the side of the machine adjacent to the furnace, a mandrel adapted to bear on the interior of the edges of the skelped strip before said strip enters the closing rolls, a pivoted member carrying the said mandrel, a guide adapted to embrace the exterior of the edges of the strip at the same time as the interior of the edges thereof is being acted on by the mandrel, means for supplying a welding gas to the pocket formed by the outer surface of the mandrel, the inner surface of the guide, and the contiguous edges of the strip, a second mandrel adapted to press on the interior of the edges of the skelped strip as said strip is passing through the said rolls, and means whereby the pressure of the last mentioned mandrel on the said interior edges of the strip may be regulated and maintained by an adjustable weight.

18. The method of manufacturing tubes from metal strips heated in a furnace which consists in drawing a heated strip into initial forming elements while said elements are in open position to receive the strip, closing said initial forming elements, closing secondary forming and finishing elements simultaneously with the closing of the initial forming elements, feeding welding gas to the edges of said strip while supporting said edges between the initial and secondary forming elements and continuously drawing said strip through said initial and secondary forming elements.

19. In the manufacture of tubes from metal strips heated in a furnace, the combination with a divided die and closing rolls cooperating therewith, means for simultaneously separating and bringing together the parts of said divided die and the two closing rolls adapted to cooperate with said die, means for drawing a heated strip from a furnace toward the die and rolls and for drawing the strip through the die and rolls when the parts are in co-operative relation, means for supplying welding gas to the edges of the strip after the strip passes through the die and before it enters the rolls, and means operating automatically to control the supply of gas as the parts of the die are brought together and to automatically cut off such supply as the parts of the die are separated.

In testimony whereof I affix my signature.

DOUGLAS WHIMSTER CHISHOLM.